Figure 1:
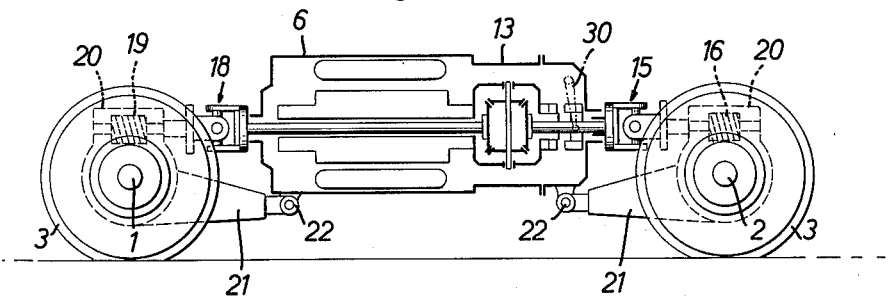

Dec. 26, 1961 F. DURAND 3,014,433
TWO-AXLE DRIVE FOR TRAMS AND OTHER VEHICLES
Filed June 24, 1959 5 Sheets-Sheet 1

INVENTOR:
FRANÇOIS DURAND
BY Robert H. Jacob
AGT.

Dec. 26, 1961    F. DURAND    3,014,433
TWO-AXLE DRIVE FOR TRAMS AND OTHER VEHICLES
Filed June 24, 1959    5 Sheets-Sheet 2

INVENTOR
FRANÇOIS DURAND

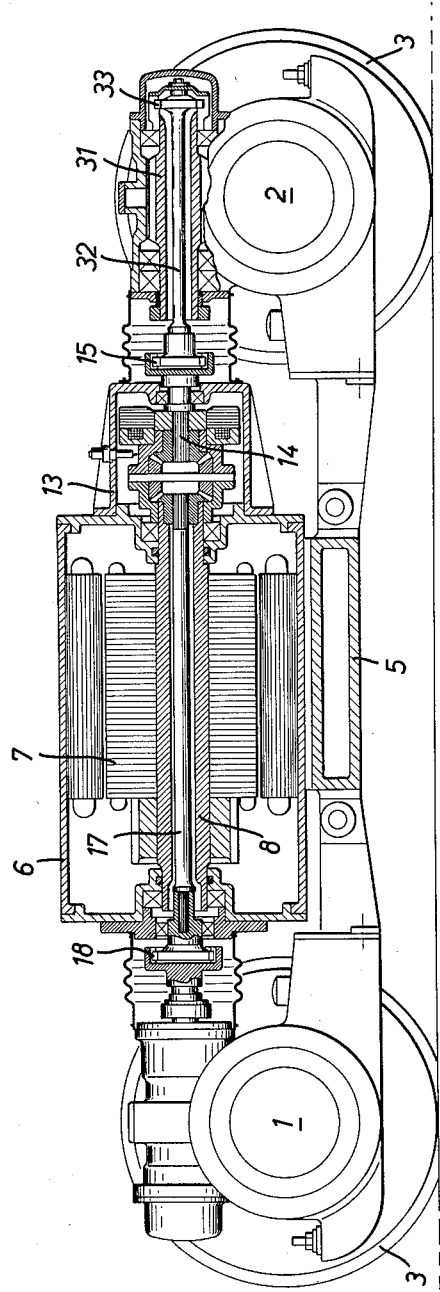

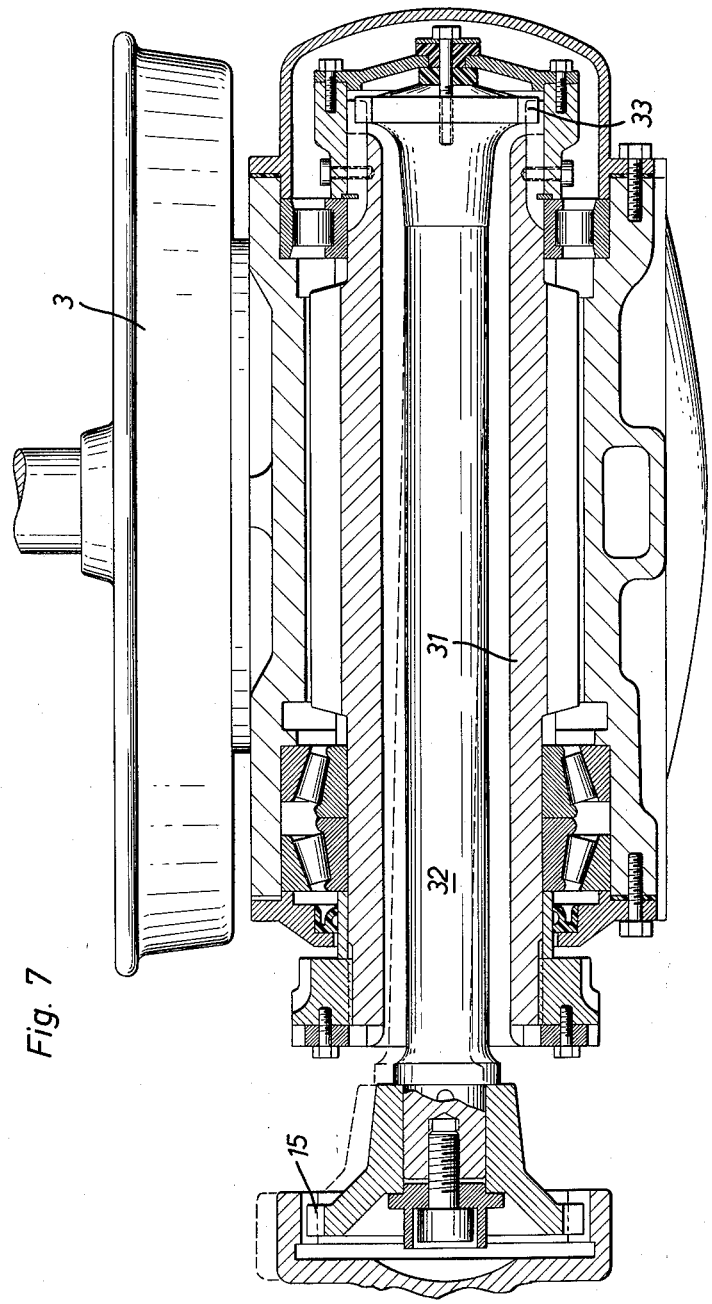

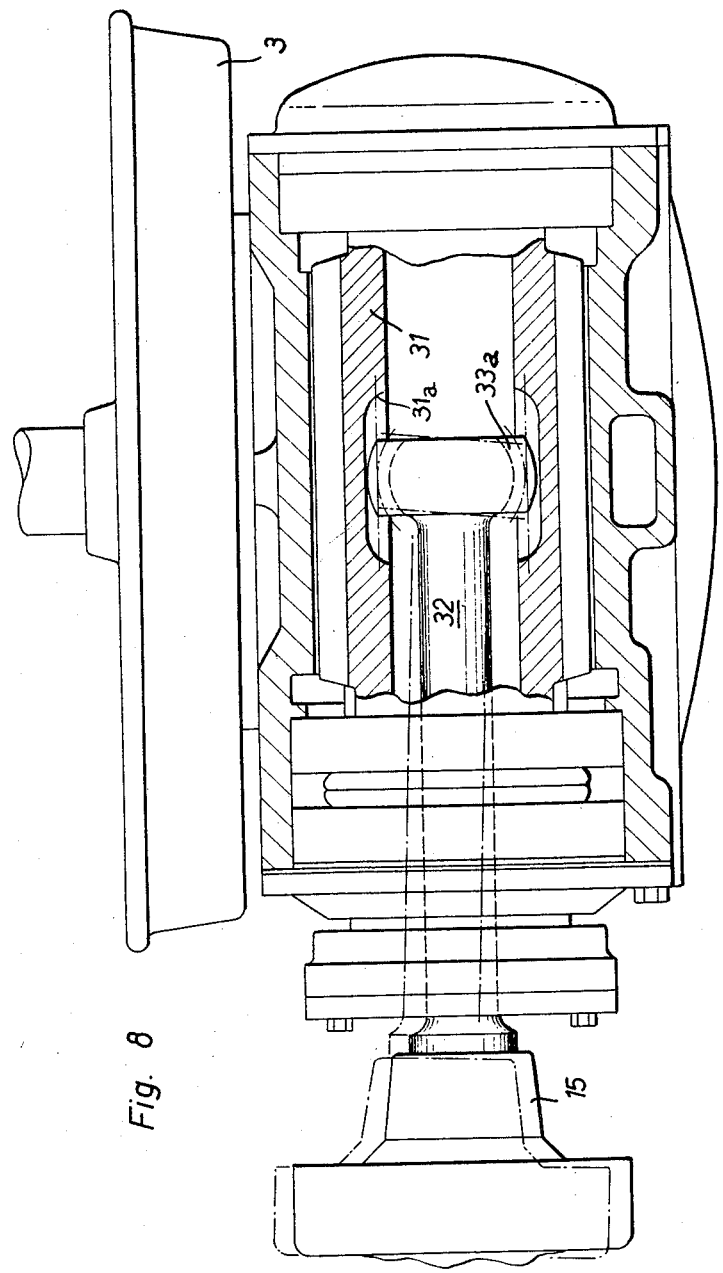

United States Patent Office 3,014,433
Patented Dec. 26, 1961

3,014,433
TWO-AXLE DRIVE FOR TRAMS AND OTHER VEHICLES
Francois Durand, 12 Rue Alfred Roll,
Paris XVIIE, France
Filed June 24, 1959, Ser. No. 822,479
Claims priority, application Germany June 25, 1958
4 Claims. (Cl. 105—97)

The present invention concerns the improvement of two-axle drives for trams and the like vehicles, more particularly for their bogies. The invention is based on a construction in which only one electric motor, which drives on both axles, is mounted between the driving axles in the longitudinal direction. For this purpose, it is already known to connect one end of the motor rotor for power transmission by way of an angle gearing to to one driving axle, and the other end of the rotor by way of an angle gearing to the other driving axle.

This method of power transmission from a motor to two driving axles, which in their turn are connected together by friction via the wheels and rails results in non-uniform power distribution to the driving axles, since the wheels do not have exactly the same diameters, due to their manufacture or difference in wear, but in operation have the same speeds. Torsion shafts have therefore already been included between motor and driving axles. This construction as well as the use of friction clutches and the like can only be regarded as an imperfect make-shift solution, since the shortcoming is not eliminated at the source. Furthermore, the torsion shaft has already been mounted in a hollow shaft of the motor in order to reduce the overall length.

In contradistinction thereto, the invention makes use of a differential for distributing the driving power of the motor uniformly to the two driving axles. In very different branches of the art, different constructions and relative associations of motor and differential have been developed for distributing the driving power uniformly to two shafts.

Accordingly, the invention does not reside generally in the use of a differential, but in a very definite formation and association of a differential with the motor and driving axles with the object of providing a particularly advantageous two-axle drive for trams and the like with only one electric motor, which satisfies all requirements with regard to the drive and also is particularly suitable constructionally for the restricted space conditions which obtain precisely in trams and particularly in their bogies. Furthermore, the invention also indicates a solution whereby a vehicle can be constructed with a very low floor which is continuous in the longitudinal direction.

The invention resides essentially in the feature that the electric motor, which is provided in known manner with a hollow shaft, or its rotor, actuates the planet carrier of a differential and that one sun-wheel of the differential drives one track-wheel driving axle and the other sun-wheel drives the other track-wheel driving axle through the hollow shaft of the rotor. In the drive according to the invention, the differential casing can be flanged co-axially to the motor housing so as to obtain a conceivably short overall length. It is however also within the scope of the invention to accommodate motor and differential co-axially in a common housing. In accordance with the invention, motor and differential form an externally simple and compact unit, which can be easily accommodated longitudinally between the axles, even in a short bogie. This unit can be fixed resiliently to the bogie frame. With this simple space-saving construction, the invention nevertherless provides for equal distribution of the motor power to the two driving axles, even when the wheel diameters are different. Overstressing of individual parts, due to uneven power distribution, can no longer occur.

To prevent slipping or skidding during sudden starting or braking of one driving wheel set, which is less loaded due to tilting, a locking means is also provided in accordance with the invention, which can lock the differential on starting or braking. Since the differences in speed of the differential sun wheels are only very slight—it being mainly necessary to compensate the differences in speed due to the differences in the driving wheel diameters—a simple claw clutch is sufficient for this purpose, which holds the planet carrier fast for the short starting or braking period. If the driving wheel diameters may have differences greater than 4%, it is then more advantageous to use a plate clutch or coupling instead of the claw clutch.

The driven shafts of the two sun wheels each operate on the two driving axles by way of an angle gearing, advantageously with the interposition of a universal joint. As angle gearing a bevel gearing has preferably been used heretofore. A bevel gearing, however, is relatively wide and in addition must be accurately aligned and remain so in regard to distances in three directions, especially also with the driven bevel pinion. In contrast thereto, according to a further proposal of the invention a reversible worm gearing with a high gear ratio is employed for the transmission of power to the driving axles. This worm gearing is less sensitive, particularly in regard to the longitudinal position of the worm. In addition, a worm gearing in comparison with a bevel gearing has the considerable advantage of smaller dimensions for the same performance. In particular, it is much narrower, so that by its use a further proposal of the invention can be realized particularly well, which consists in mounting the electric motor with the differential laterally and externally relatively to the road wheels. This in its turn provides the possibility of construtcing a vehicle having a continuous, very low bottom floor.

Figure 2:
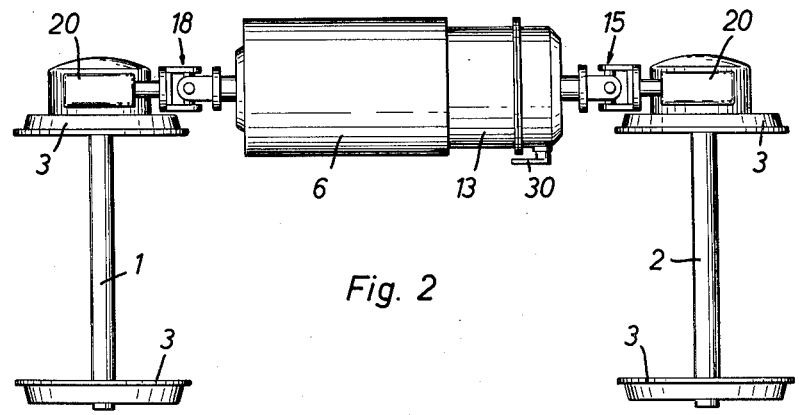
Figure 3:
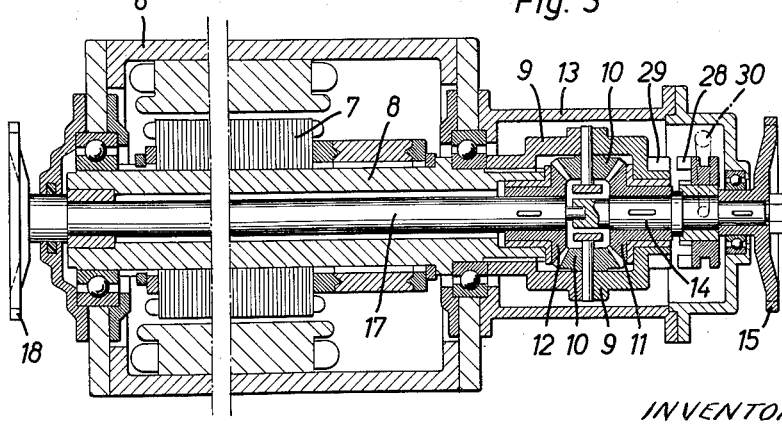
Figure 4:
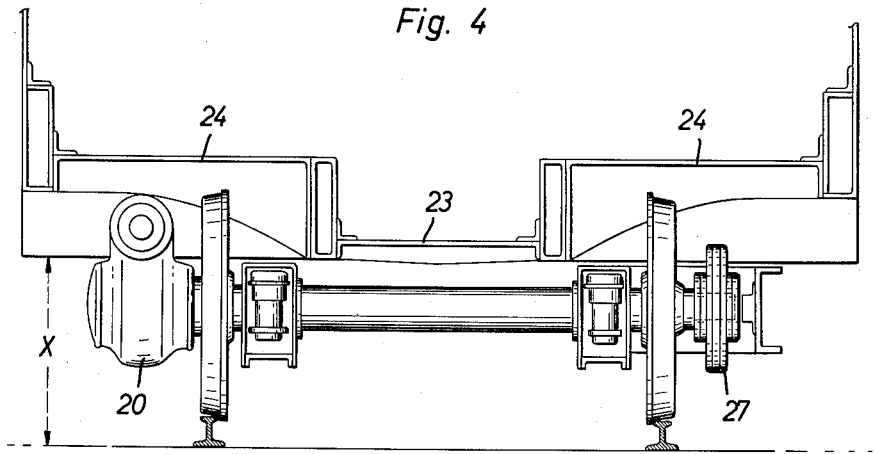
Figure 5:
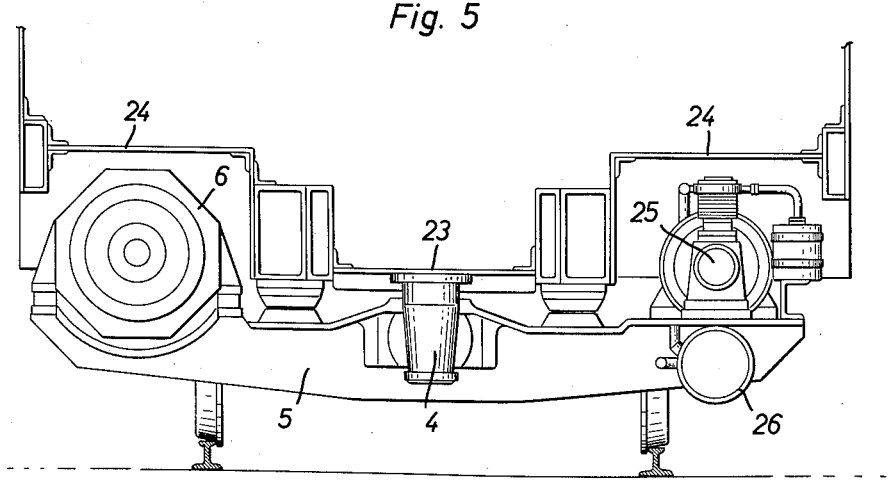

Two embodiments of the invention are reproduced diagrammatically in the drawing, wherein:

FIG. 1 shows a longitudinal section,
FIG. 2 a plan and
FIG. 3 on a larger scale a longitudinal section through motor, differential and locking means according to an embodiment of the invention,
FIGS. 4 and 5 are two different cross-sections through a vehicle constructed in accordance with the invention,
FIGS. 6 and 7 a further embodiment of the invention in an overall cross-section and a part section on a larger scale, and
FIG. 8 illustrates a detail of a still further embodiment of the invention.

1 and 2 denote the driving axles for the wheels 3 of a bogie or a vehicle, for example a tram vehicle, the bogie pin of which is denoted by 4 and the supporting frame by 5 (FIG. 5). It is known to mount between the driving axles 1 and 2 in the longitudinal direction an electric motor, which drives these axles via drives and angle gearing on both sides.

In contrast thereto, according to the invention the motor 1 having a housing 6 drives by means of its rotor 7 via the hollow shaft 8 the planet carrier 9 rigidly connected to the hollow shaft 8. From the planet carrier 9 a uniform power distribution is effected via the planet wheels 10 to the sun wheels 11 and 12 of a differential gearing, which by means of its housing 13 is assembled co-axially with the motor housing 6. The sun wheel 11 drives the axle 2 by means of its shaft 14 via the coupling 15 and the worm gearing 16, and the sun wheel 12 drives the axle 1 by means of its shaft 17 through the hollow shaft 8 via the coupling 18 and the worm gearing 19. The two worm gearings 16, 19 are non-self-locking and have a considerable gear ratio. They are accommodated in housings 20, the torque arms 21 of which have their supports 22 on the housings 6 and 13.

As will be seen from FIGURES 1, 4 and 5, the entire drive is not situated between the wheels 3 as heretobefore but advantageously laterally and externally. This affords the considerable advantage of being able to provide the entire vehicle with a continuous bottom floor 23 of very low height. Correspondingly, without the use of troublesome steps in the vehicle interior, the floor height at the doors, indicated by x, can be made small, which is a prerequisite for continuous entry and exit, especially in the case of considerable crowding. At 24 are indicated the platforms for the seats not shown more particularly.

On the side opposite the drive, likewise outside, are accommodated the usual auxiliary machines. These include, as example, the air compressor 25 with the reservoir 26 to be seen in FIG. 5. FIG. 4 again shows on the same side, likewise outside, the disc brake 27. As already mentioned, in order to prevent skidding of the wheels of a wheel set more or less relieved of load by tilting on sharp starting or braking, a claw clutch 28 is also provided, which can arrest the planet carrier 9 by means of counter-claws 29. The operating lever for this clutch is shown at 30.

To obtain a still better and more compact construction, it is proposed in accordance with the embodiment shown in FIGS. 6 and 7 to make the shafts of the worms of the worm gearings hollow and to allow the driving shafts coming from the sun wheels of the differential to actuate, through said worm shafts with clearance, the part of the worm shafts remote from the motor, approximately from the middle of the shaft to the end thereof, and to use spatially movable couplings, teeth, splines or the like, such as are known per se.

The motor and differential can thereby be brought as close as possible to the worm gearings. Nevertheless, the necessary freedom of movement between these parts is retained, since such movements can take effect unimpededly in the spaces of the hollow worm-wheel shafts between the latter and the driving shafts.

If the driving shaft is allowed to engage the end of the hollow worm-shaft remote from the motor, the deflection of the driving shaft is then comparatively slight in the event of center displacement between motor and worm-shaft, and despite the compact construction, the driving shaft is long, since it extends over the entire length of the worm-shaft. Moreover, the circular cross-section of this shaft is sufficiently small to constitute a torsion rod which serves to reduce rotary shocks.

It may, however, also be of advantage to position the coupling between the driving shaft and worm-shaft more to the center of the worm-shaft as illustrated in FIGURE 8. If it is situated at the center thereof, a particularly favourable power distribution is then obtained which acts advantageously on the worm gearing. The worm-shaft is then advantageously coupled to the driving shaft by means of arcuate teeth 33a provided on the end of the driving shaft and engaging longitudinal grooves 31a in the hollow worm-shaft 31. This method of coupling is particularly simple; in addition, it compensates directly any differences in length. It is already in use in other branches of industry, for example in rolling mill construction in pinion housings. It is, however, novel and advantageous in the case of a worm gearing.

In particular FIGS. 6 and 7, 1 and 2 denote the driving axles for the wheels 3 of a bogie, the supporting frame of which is shown at 5. The motor housing is denoted by 6, the rotor by 7 and the hollow shaft by 8.

Only the driven shafts 14 and 17 of the differential gearing accommodated in the housing 13 are shown, since the construction and operation of the differential have already been described more fully with reference to FIGS. 1 to 5.

What is novel and advantageous, as compared with FIGS. 1 to 5 is that the driving shafts 14 and 17, particularly their couplings 15 and 18 do not act on the inner ends of the worm-shafts but upon their outer ends, as shown on the right in FIG. 6 and on a larger scale in FIG. 7.

For this purpose, the worm-shaft 31 is made hollow, and the driving shaft 32 from the coupling 15 is passed through it with clearance and is coupled to the worm-shaft 31 by the coupling 33. This permits extensive possibility of adjustment, in the case of center displacements, even if the coupling 15 is close to the worm-shaft 31, as indicated by dash lines in FIG. 7. Instead of as shown in FIGS. 6 and 7 the driving shaft 32 may extend only about half way along the worm-shaft 31 as in FIG. 8 and may be coupled to it at that point.

Although the construction according to the invention as shown in FIGS. 6 and 7 is mainly intended for two-axle drives, it may also be of advantage, however, in the case of single-axle drives, in which there is a requirement for drive and worm gearing to be as close together as possible, while nevertheless there should be a certain mutual freedom of movement.

I claim:

1. Two axle drive for street cars or the like vehicles having a pair of driving axles and comprising an electric motor including a rotor and a stator extending longitudinally of the vehicle between said driving axles and a single differential disposed endwise of said motor for driving both said axles, said differential having a planet carrier and a pair of sun wheels and said motor having a hollow shaft forming a unit with said rotor and with said planet carrier, a first power transmission means extending through said hollow shaft and being operatively connected at one end to one of said sun wheels and at the other end to one of said driving axles, a second power transmission means extending in opposite direction to said first means operatively connecting the other said sun wheel to the other said axle, and means for locking said differential on starting and on braking disposed endwise of said differential and remote from said motor.

2. Two axle drive for street cars or the like vehicles having a pair of driving axles and comprising an electric motor including a rotor and a stator extending longitudinally of the vehicle between said driving axles and a single differential disposed endwise of said motor for driving both said axles, said differential having a planet carrier and a pair of sun wheels and said motor having a hollow shaft forming a unit with said rotor and with said planet carrier, a first power transmission means extending through said hollow shaft and being operatively connected at one end to one of said sun wheels and at the other end to one of said driving axles and a second power transmission means extending in opposite direction to said first means operatively connecting the other said sun wheel to the other said axle, said power transmission means being provided proximate said axles with reversible worm gears having high transmission ratios and including hollow shafts, and driving shafts operatively connected to said sun wheels and extending with clearance into said hollow shafts towards the ends of said hollow shafts remote from said motor, slidable coupling means connecting said driving shafts to said hollow shafts and coupling means intermediate said driving shafts and said sun wheels.

3. Two axle drive for street cars or the like vehicles having a pair of driving axles and comprising an electric motor including a rotor and a stator extending longitudinally of the vehicle between said driving axles and a single differential disposed endwise of said motor for driving both said axles, said differential having a planet carrier and a pair of sun wheels and said motor having a hollow shaft forming a unit with said rotor and with said planet carrier, a first power transmission means extending through said hollow shaft and being operatively connected at one end to one of said sun wheels and at the other end to one of said driving axles and a second power transmission means extending in opposite direction to said first means operatively connecting the other said sun wheel to the other said axle, said power transmission means being provided proximate said axles with reversible worm gears having high transmission ratios and including hollow shafts, and driving shafts operatively connected to said sun wheels and extending with clearance into said hollow shafts towards the ends of said hollow shafts remote from said motor, slidable coupling means connecting said driving shafts to said hollow shafts and coupling means intermediate said driving shafts and said sun wheels, said slidable coupling means being disposed substantially centrally of said hollow shafts of said power transmission means and comprising longitudinal grooves in said hollow shafts and arcuate teeth endwise of said driving shafts.

4. Two axle drive for street cars or the like vehicles having a pair of driving axles and comprising an electric motor including a rotor and a stator extending longitudinally of the vehicle between said driving axles and a single differential disposed endwise of said motor for driving both said axles, said differential having a planet carrier and a pair of sun wheels and said motor having a hollow shaft forming a unit with said rotor and with said planet carrier, a first power transmission means extending through said hollow shaft and being operatively connected at one end to one of said sun wheels and at the other end to one of said driving axles and a second power transmission means extending in opposite direction to said first means operatively connecting the other said sun wheel to the other said axle, said power transmission means being provided proximate said axles with reversible worm gears having high transmission ratios ind including hollow shafts, and driving shafts operatively connected to said sun wheels and extending with clearance into said hollow shafts towards the ends of said hollow shafts remote from said motor, slidable coupling means connecting said driving shafts to said hollow shafts and coupling means intermediate said driving shafts and said sun wheels, and said driving shafts in said hollow shafts of said power transmission means being torsion rods.

References Cited in the file of this patent
UNITED STATES PATENTS

| | | |
|---|---|---|
| 1,054,314 | Riddle | Feb. 25, 1913 |
| 1,203,664 | Thomas | Nov. 7, 1916 |
| 1,567,972 | Meehan | Dec. 29, 1925 |
| 1,898,997 | Feightner | Feb. 28, 1933 |
| 2,024,688 | Gray | Dec. 17, 1935 |
| 2,636,449 | Kuhr | Apr. 28, 1953 |
| 2,903,973 | Lewis | Sept. 15, 1959 |
| 2,922,383 | Oestreicher | Jan. 26, 1960 |